April 14, 1964     R. R. WINTER     3,128,559
DEPTH MICROMETER
Filed Dec. 2, 1960     2 Sheets-Sheet 1
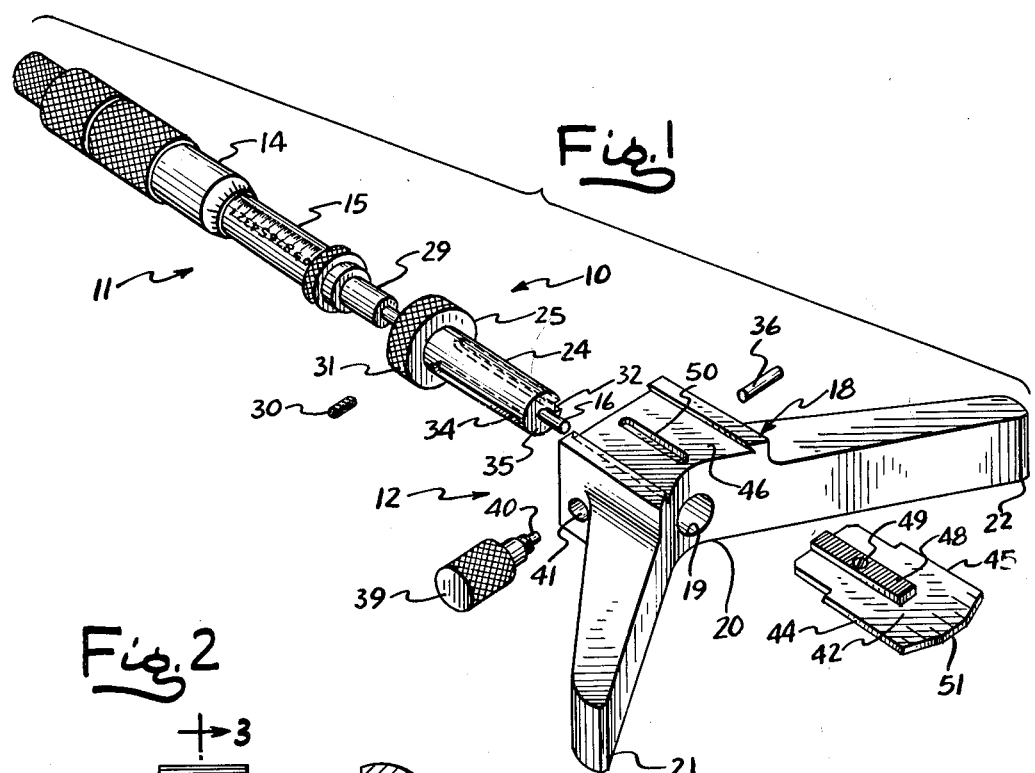
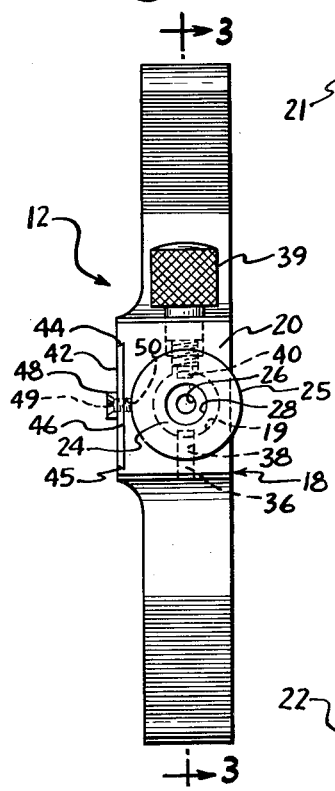
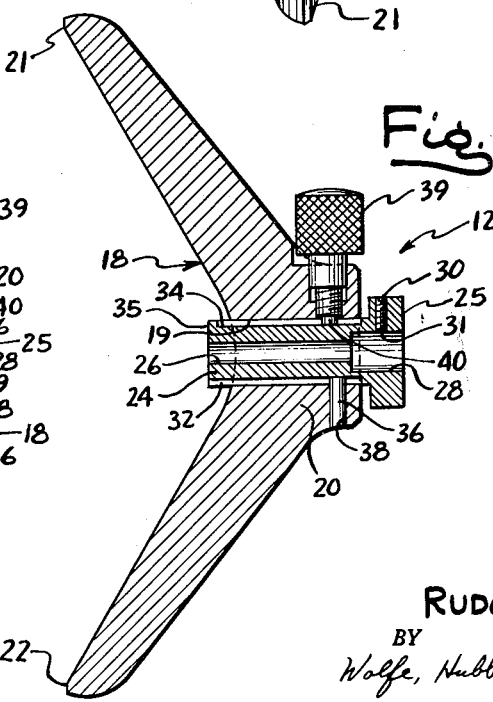
INVENTOR.
RUDOLPH R. WINTER
BY
Wolfe, Hubbard, Voit & Osann
ATTYS.

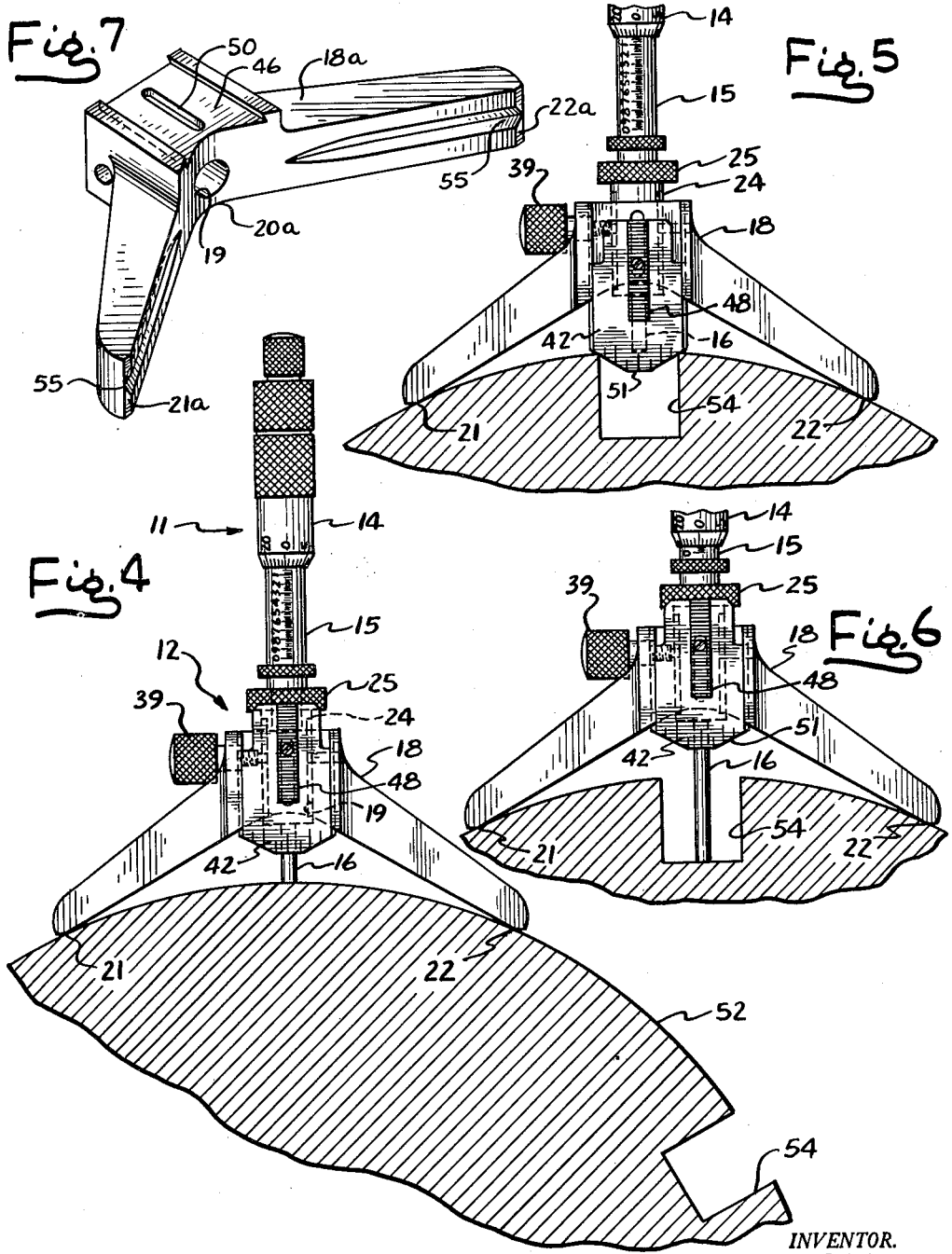

United States Patent Office 3,128,559
Patented Apr. 14, 1964

3,128,559
DEPTH MICROMETER
Rudolph R. Winter, 1381 Woodland Place,
Plymouth, Mich.
Filed Dec. 2, 1960, Ser. No. 73,322
10 Claims. (Cl. 33—170)

The present invention relates generally to precision measuring tools and, more particularly, to an improved mechanics' micrometer depth gauge characterized by its ability to measure with a high degree of accuracy the depth of small grooves or the like in round workpieces having different diameters.

It is a general object of this invention to provide a precision measuring tool for gauging the depth of grooves in workpieces having a wide range of diameters and in which the depth measured may be read directly on the tool.

It is another object of the present invention to provide a novel micrometer base assembly that can be used with depth micrometers of a conventional type for measuring the depth of grooves in curved workpieces. In this connection it is an object to provide a micrometer base assembly that not only provides highly accurate depth measurements, but which can at the same time be utilized with depth micrometer assemblies presently stocked by manufacturers thus minimizing additional tooling costs and resulting in substantial savings to the manufacturers.

It is a further object of the invention to provide a precision measuring tool that can be simply and expeditiously adjusted by the operator for use with workpieces having either flat or rounded surfaces, and which may be used to gauge the depth of grooves in both concave and convex workpieces.

It is another object of the invention to provide a cylindrical depth micrometer that may be readily oriented with respect to the workpiece being measured by unskilled personnel.

It is an object of the invention to provide a precision measuring tool that may be quickly assembled and disassembled and in which the components are readily interchanged with like components of different size, thus greatly increasing the versatility of the tool.

These and other objects and advantages of the invention are attained by the construction and arrangement shown by way of illustration in the drawings, in which:

FIGURE 1 is an exploded perspective view of a depth micrometer embodying the features of the present invention;

FIG. 2 is a plan view of the cylindrical depth micrometer base assembly utilized with the tool illustrated in FIG. 1;

FIG. 3 is a sectional view taken substantially along the line 3—3 of FIG. 2;

FIG. 4 is a side elevation showing the manner of establishing a zero reference setting for the instrument preparatory to measuring the depth of a groove;

FIG. 5 is a fragmentary view similar to FIG. 4 illustrating the manner of properly orienting the tool relative to the groove being measured;

FIG. 6 is a fragmentary view similar to that shown in FIG. 5 and illustrating the micrometer with its measuring spindle advanced; and FIG. 7 is a perspective view of a further modification of the V-shaped base utilized with the tool illustrated in FIG. 1.

While the invention has been illustrated and will be described with particularity in connection with a preferred embodiment thereof, there is no intention that it thus be limited to such detail. On the contrary, it is intended here to cover such equivalent and alternative constructions as fall within the true spirit and scope of the appended claims.

Referring first to FIG. 1, there is illustrated a measuring tool 10 including a depth micrometer assembly 11 of conventional type and a micrometer base assembly 12 embodying the features of the present invention. As is conventional in precision tools of this type, the depth micrometer assembly 11 includes a micrometer thimble 14, a micrometer barrel 15 and an axially movable micrometer spindle 16. It will be understood by those skilled in the art, the rotation of the thimble 16 effects, through a suitable screw, axial advancement or retraction of the spindle 16 within the barrel 15.

In accordance with one of the important aspects of the present invention, a base assembly is provided that is readily attached to a depth micrometer of conventional type to constitute a precision instrument that may be used to measure with a high degree of accuracy the depth of grooves or the like in rounded workpieces having a wide range of diameters and in which the depth measured is read directly from the micrometer. In the preferred embodiment, as illustrated in FIGS. 1 through 3, a base assembly 12 is disclosed having an inverted V-shaped base 18 formed with an axially disposed bore 19 extending through its apex 20. A pair of downwardly diverging work engaging arms 21, 22 are formed integrally with the base 18 for a purpose presently to be described.

To permit the inverted V-shaped base 18 to be readily attached to the depth micrometer assembly 12 while at the same time providing a precision tool that is highly versatile and that can be used to measure the depth of grooves in workpieces having a wide range of diameters, the base assembly 12 includes a generally cylindrical compensating sleeve 24 which is mounted in the axially disposed bore 19 in the base 18 (FIGS. 2 and 3). One end of the compensating sleeve 24 is enlarged as indicated at 25. The sleeve has formed therein an axially disposed bore 26 terminating in an enlarged chamber 28 formed within the enlarged end portion 25 of the sleeve 24. The chamber 28 is dimensioned to receive a reduced end portion 29 on the micrometer barrel 15 while the bore 26 is of sufficient diameter to allow the micrometer spindle 16 to pass therethrough with freedom for axial movement. A set screw 30, or similar retaining means, is positioned in a radially threaded opening 31 located in the end portion 25 of the compensating sleeve 24 and is tightened against the end portion 29 of the micrometer barrel to rigidly anchor the compensating sleeve to the micrometer assembly 11.

In order to insure that the micrometer assembly 11 and the compensating sleeve 24 are properly oriented with respect to the V-shaped base 18, yet free for limited axial movement to allow the tool 10 to be used with different diameter workpieces, the sleeve 24 has formed thereon a pair of longitudinally disposed keyways 32, 34 (FIGS. 1 and 3). In the illustrative form of the invention, the keyways 32, 34 are formed on diametrically opposed surfaces of the sleeve 24 with the keyway 32 extending substantially the entire length of the sleeve 24 and the keyway 34 terminating slightly short of the end 35 of the sleeve (the left end of the sleeve as viewed in FIG. 3) so as to form a "blind" keyway. An alinement pin 36 is mounted within a transverse opening 38 in the base 18 with one end of the pin projecting radially into the bore 19. In assembly of the tool, the keyway 32 on the compensating sleeve 24 is alined with the pin 36 and the sleeve is then inserted into the bore 19 in the base 18. In order to allow the base 18 to be rigidly anchored to the compensating sleeve 24 in a selected longitudinal position of the sleeve relative to the bore 19, a thumb screw 39 having a reduced tip 40 is screwed into a transversely disposed threaded opening 41 (FIG. 1) and tightened until the tip 40 is received within the "blind" keyway 34 in the sleeve 24.

It will be appreciated by those skilled in the art that when the thumb screw 39 is firmly tightened so that the tip 40 engages the sleeve 24, the sleeve is securely anchored within the base 18 and, since the micrometer assembly 11 is rigidly secured to the sleeve 24 by the set screw 30, the micrometer assembly is therefore integral with the base assembly 12. If it is desired to shift the sleeve 24 longitudinally within the bore 19 in the base 18, it is merely necessary to back off slightly on the thumb screw to free the sleeve for longitudinal movement and then retighten the thumb screw when the components are in the desired position. Since the keyway 34 is a "blind" keyway, it is possible to loosen the thumb screw slightly without danger that the base assembly 12 will become detached from the micrometer assembly 11.

In keeping with the present invention, a centering device is mounted on the base assembly 12 for insuring that the tool 10 is properly oriented relative to the groove or slot being measured. To this end, a centering guide 42 (FIGS. 1 and 2) having tapered lateral edges 44, 45 is slidably mounted in a dovetail groove 46 formed in one face of the V-shaped base 18 at its apex 20. To facilitate actuation of the centering guide 42, an elongate knurled bar 48 is securely mounted to the guide by an appropriate fastener, for example, a screw 49. To prevent the centering guide 42 from becoming detached from the base assembly 12, the threaded portion of the screw 49 projects through the bottom face of the guide and is received within an undercut "blind" slot 50 formed in the base of the dovetail groove 46 (see FIGS. 1 and 2). The leading edge 51 of the centering guide 42 has inscribed thereon a plurality of guide lines which are utilized to insure that the micrometer spindle 16 is properly oriented with respect to the groove being measured.

Having described the features employed in the construction of the novel micrometer base assembly 12, the operation of the precision tool 10 will now be discussed in connection with FIGS. 4 through 6.

The micrometer assembly 11 is first set to a zero reading as is most clearly illustrated in FIG. 4. The thumb screw 39 is then slightly backed off so that the compensating sleeve 24 and the micrometer assembly 11 are free for longitudinal movement within the bore 19 of the V-shaped base 18. The tool 10 is then positioned over a portion of a workpiece 52 having a true radius, i.e., a portion of the workpiece where no groove has been formed. When the tips of the work engaging arms 21, 22 are engaged with the workpiece 52 the compensating sleeve 24 and the rigidly mounted micrometer assembly 11 are advanced until the tip of the spindle 16 engages the workpiece. The thumb screw is then retightened, locking the micrometer assembly 11 and base assembly 12 together at the proper zero reference micrometer setting for any workpiece having a diameter the same as the workpiece 52. It will be appreciated, therefore, that the present precision tool 10 may be readily adjusted to show a direct zero reference micrometer reading for different diameter workpieces simply by properly adjusting the longitudinal position of the compensating sleeve 24, thus producing a highly versatile instrument capable of providing accurate and direct readings from a wide range of workpieces.

When the tool is set at the proper zero reference reading, it is then repositioned on the workpiece 52 with the arms 21, 22 straddling the groove 54, the depth of which is to be measured (FIG. 5). The centering guide 42 is then advanced by pressing on the knurled bar 48 until the leading edge 51 of the guide is engaged with the sides of the groove. When the sides of the groove 54 are equidistant from the center-line of the guide 42, the guide is retracted without disturbing the position of the tool.

The user of the tool 10, after having established a direct zero reference reading for the particular workpiece and after properly centering the tool relative to the groove being measured, is then prepared to measure directly the depth of the groove 54. This is accomplished simply by rotating the micrometer thimble 12 so as to advance the spindle 16. When the spindle engages the bottom of the groove, the depth of the groove 54 is read directly from the micrometer barrel 15.

While the present invention has been described in connection with a preferred embodiment thereof, there is illustrated in FIG. 7 a modified inverted V-shaped base 18a which enables the precision tool 10 of FIG. 1 to be utilized with a high degree of accuracy on spherical workpieces. To this end, the base 18a is provided with a pair of downwardly diverging work engaging arms 21a, 22a, each having a generally V-shaped groove 55 formed in the work engaging face thereof. While the grooves 55 are illustrated as extending from the tip of each arm only partially towards the apex 20a of the base 18a, it will be appreciated that the grooves could be made longer if desired.

The provision of V-shaped grooves in the work engaging faces of the arms 21a, 22a, allows the precision tool 10 (FIG. 1) to be accurately positioned on a spherical workpiece (not shown) with the spindle 16 oriented perpendicular to the center of the sphere. Thus, the user of the tool 10 may measure the depths of holes or flats in a spherical workpiece in the same manner as that followed with cylindrical or rounded workpieces.

I claim as my invention:

1. A tool for measuring the depth of grooves in rounded workpieces having different diameters comprising, in combination, an inverted V-shaped base including a pair of diverging work engaging arms, said base having a bore extending through its apex, a depth micrometer mounted in said bore, said micrometer having a work engaging spindle passing through said bore and longitudinally movable therein, means for locking said micrometer to said base in a selectable one of diverse reference positions within said bore, and means for centering said tool relative to the sides of said groove.

2. A tool for measuring the depth of a groove in a workpiece comprising, in combination, an inverted V-shaped base including a pair of diverging work engaging arms, said base having a bore extending through its apex, a cylindrical compensating sleeve mounted in said bore with freedom for limited longitudinal movement relative thereto, means on said base for locking said sleeve in a selectable one of diverse reference positions within said bore, and a depth micrometer rigidly mounted in said sleeve, said micrometer having a measuring spindle passing coaxially through said sleeve for determining the depth of said groove.

3. A tool for measuring the depth of a groove in a workpiece comprising, in combination, an inverted V-shaped base including a pair of diverging work engaging arms, said base having a bore extending through its apex, a cylindrical compensating sleeve mounted in said bore with freedom for limited longitudinal movement relative thereto, means on said base for locking said sleeve in a selectable one of diverse reference positions within said bore, a depth micrometer rigidly mounted in said sleeve, said micrometer having a measuring spindle passing coaxially through said sleeve for determining the depth of said grove, and means mounted on said base for centering said tool relative to the sides of said groove.

4. A tool for measuring the depth of a groove in a workpiece comprising, in combination, an inverted V-shaped base including a pair of diverging work engaging arms, said base having a bore extending through its apex, a cylindrical compensating sleeve mounted in said bore with freedom for limited longitudinal movement relative thereto, said sleeve having a pair of longitudinally disposed, diametrically opposed grooves formed therein, means extending through said base and received within one of said grooves for alining said sleeve within said bore, adjustable means extending through said base and received within the other of said grooves for selectively locking said sleeve in a desired position, a depth micrometer rigidly mounted in said sleeve, said micrometer having a measuring spindle passing coaxially through said sleeve for determining the depth of said groove.

5. A tool for measuring the depth of a groove in a round workpiece comprising, in combination, an inverted V-shaped base including a pair of diverging work engaging arms, said base having a bore extending through its apex, a depth micrometer mounted in said bore in a selectable one of diverse longitudinal positions, said micrometer having a work engaging spindle passing through said bore with freedom for longitudinal movement relative to said base, and means mounted on said base for centering said tool relative to the sides of the groove being measured.

6. A tool for measuring the depth of a slot in a round workpiece comprising, in combination, an inverted V-shaped base including a pair of diverging work engaging arms, said base having a bore extending through its apex, a depth micrometer mounted in said bore, said micrometer having a work engaging spindle passing through said bore with freedom for longitudinal movement relative to said base, a groove formed in one face of said base parallel to said bore, and a centering gauge slidably mounted in said groove for insuring that said tool is properly oriented relative to the sides of said slot.

7. For use with a depth micrometer of the type having a barrel and a work engaging spindle longitudinally movable therein, the combination comprising, an inverted V-shaped base including a pair of diverging work engaging arms, said base having a bore extending through its apex, a cylindrical compensating sleeve mounted in said bore with freedom for limited longitudinal movement, said sleeve adapted to receive and be rigidly anchored to said barrel, and adjustable means extending transversely through said base for anchoring said sleeve within said bore in different longitudinal positions.

8. For use with a depth micrometer of the type having a barrel and a work engaging spindle longitudinally movable therein, the combination comprising, an inverted V-shaped base including a pair of diverging work engaging arms, said base having a bore extending through its apex adapted to receive said barrel, means on said base for rigidly anchoring said base to said barrel in different longitudinal positions of said barrel relative to said bore, and a centering gauge slidably mounted on said base for properly orienting said base relative to the work being measured.

9. A tool for measuring the depth of flats and the like in a spherical workpiece comprising, in combination, an inverted V-shaped base including a pair of diverging work engaging arms, said base having a bore extending through its apex, a depth micrometer mounted in said bore, said micrometer having a work engaging spindle passing through said bore and longitudinally movable therein, and means formed in the work engaging face of each of said arms for orienting said tool with said spindle substantially perpendicular to the center of said workpiece.

10. For use with a depth micrometer of the type having a barrel and a work engaging spindle longitudinally movable therein, the combination comprising, an inverted V-shaped base including, a pair of diverging work engaging arms, each of said arms having a groove formed in the work engaging face thereof, said base having a bore extending through its apex adapted to receive said barrel, and means on said base for rigidly anchoring said base to said barrel in different longitudinal positions.

References Cited in the file of this patent

UNITED STATES PATENTS

| | | |
|---|---|---|
| 1,233,458 | Fisk | July 17, 1917 |
| 1,416,810 | Foster | May 23, 1922 |
| 1,656,302 | Swaney | Jan. 17, 1928 |
| 2,686,975 | Geipel | Aug. 24, 1954 |